(12) United States Patent
Zheng et al.

(10) Patent No.: US 9,705,836 B2
(45) Date of Patent: Jul. 11, 2017

(54) METHOD, SERVER AND SNS SYSTEM FOR MESSAGE INTERACTION

(71) Applicant: TENCENT TECHNOLOGY (SHENZHEN) COMPANY LIMITED, Shenzhen, Guangdong (CN)

(72) Inventors: Zhihao Zheng, Guangdong (CN); Zhu Liang, Guangdong (CN); Huixing Wang, Guangdong (CN); Xiaojun Huang, Guangdong (CN); Mingzhong Ji, Guangdong (CN); Huabin Xu, Guangdong (CN); Lijin Deng, Guangdong (CN); Yong Yang, Guangdong (CN); Yanqiang Zheng, Guangdong (CN); Guanghai Wen, Guangdong (CN); Zhihua Wu, Guangdong (CN); Changqing Liu, Guangdong (CN); Mingwei Zhang, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 420 days.

(21) Appl. No.: 14/322,819

(22) Filed: Jul. 2, 2014

(65) Prior Publication Data

US 2014/0317213 A1 Oct. 23, 2014

Related U.S. Application Data

(63) Continuation of application No. PCT/CN2013/088215, filed on Nov. 29, 2013.

(30) Foreign Application Priority Data

Jan. 29, 2013 (CN) .......................... 2013 1 0034767

(51) Int. Cl.
*H04L 12/58* (2006.01)
(52) U.S. Cl.
CPC .................................... *H04L 51/32* (2013.01)
(58) Field of Classification Search
CPC ...... H04L 51/32; H04L 51/38; H04L 67/2823; H04L 67/2842; H04L 29/06027
(Continued)

(56) References Cited

U.S. PATENT DOCUMENTS

2007/0213077 A1* 9/2007 Mian ...................... H04W 4/18
455/466
2009/0111433 A1* 4/2009 Muhonen ............ H04L 12/5895
455/414.1

(Continued)

FOREIGN PATENT DOCUMENTS

CN 102055804 A 5/2011
CN 102098549 A 6/2011
CN 103139049 A 6/2013

OTHER PUBLICATIONS

International Search Report issued in corresponding International Application No. PCT/CN2013/088215.

*Primary Examiner* — Ruolei Zong
(74) *Attorney, Agent, or Firm* — Haug Partners LLP; William S. Frommer

(57) ABSTRACT

A method for message interaction includes: receiving, at a server, a first multi-media message recorded and published by a first terminal when the server detects that the first terminal in a social network service (SNS) system carries out a message publishing operation; performing, at the server, a transcoding process on the first multi-media message to generate at least one second multi-media message, and storing the first multi-media message and the at least one second multi-media messages; and allocating, at the server, a publishing identifier and sending the publishing identifier
(Continued)

to the first terminal to inform the first terminal that the message publishing operation is successful. Further, a server and a SNS system are also described. In the present disclosure, message interaction can be performed based on multimedia messages in the SNS system, thereby enriching variety of message contents, improving efficiency of message interaction, and enhancing convenience of social activities.

17 Claims, 9 Drawing Sheets

(58) Field of Classification Search
  USPC .......................................................... 709/206
  See application file for complete search history.

(56) References Cited

U.S. PATENT DOCUMENTS

2009/0291697 A1\* 11/2009 Kit Tam .................. H04W 4/18
  455/466
2011/0153764 A1\* 6/2011 Li ....................... H04W 76/002
  709/206

\* cited by examiner

METHOD, SERVER AND SNS SYSTEM FOR MESSAGE INTERACTION

CROSS-REFERENCE TO RELATED APPLICATIONS

This application is a U.S. continuation application under U.S.C. §111(a) claiming priority under U.S.C. §§120 and 365(c) to International Application No. PCT/CN2013/088215, filed on Nov. 29, 2013, which claims the priority benefit of Chinese Patent Application No. 201310034767.1, entitled "METHOD, SERVER AND SNS SYSTEM FOR MESSAGE INTERACTION" and filed on Jan. 29, 2013, the contents of which are incorporated by reference herein in its entirety for all purposes.

FIELD OF THE TECHNICAL

The present invention relates to internet technical field, and more particularly, to method, server and SNS system for message interaction.

BACKGROUND

This section provides background information related to the present disclosure which is not necessarily prior art.

With the development of SNS technology, users may take advantage of the SNS system to perform message communication with each other. In a traditional social networking service, communicated messages are generally text messages or picture messages. For instance, a user may publish a text message in the SNS system, or the user may upload and publish a picture message in the SNS system. For another instance, a user may upload a picture message and publish the picture message with textual description, and other users may browse the message published by this user and perform social operations like commenting or forwarding on it in the SNS system. In the traditional way of SNS message communication described above, the communication efficiency is relatively low, and the message contents lack variety. Thus, the traditional SNS message communication is unable to adapt to users' actual demand of convenience and variety richness for information technology.

SUMMARY

Exemplary embodiments of the present invention provide a method, a server and a SNS system for message interaction, which can achieve the interaction of multi-media messages, improve the efficiency of message interaction, and enhance the convenience of social activities.

According to a first aspect of the invention, it is provided a method for message interaction, which may comprise: receiving, at a server, a first multi-media message recorded and published by a first terminal when the server detects that the first terminal in a social network service (SNS) system carries out a message publishing operation; performing, at the server, a transcoding process on the first multi-media message to generate at least one second multi-media message, and storing the first multi-media message and the at least one second multi-media messages; and allocating, at the server, a publishing identifier and sending the publishing identifier to the first terminal to inform the first terminal that the message publishing operation is successful, the publishing identifier being used for identifying a storage address of the first multi-media message and a storage address of each of the second multi-media messages.

According to a second aspect of the invention, it is provided another method for message interaction, which may comprise: obtaining, at a server, a publishing identifier carried in a multi-media message play request and detecting a system parameter of a second terminal, when the server receives the multi-media message play request sent by the second terminal in a social network service (SNS) system; searching, at the server, according to the publishing identifier, for a storage address of a first multi-media message and a storage address of at least one second multi-media message which are identified by the publishing identifier; and selecting, at the server, according to the system parameter of the second terminal, one storage address of a multi-media message adapted to the second terminal from the storage address of the first multi-media message and the storage address of the at least one second multi-media message which are obtained by searching, and sending to the second terminal with the storage address of the multi-media message adapted to the second terminal, to make the second terminal play the adapted multi-media message.

According to a third aspect of the invention, it is provided a server, which may comprises: a receiving module, which is configured to receive a first multi-media message recorded and published by a first terminal when the server detects that the first terminal in a social network service (SNS) system carries out a message publishing operation; a message processing module, which is configured to perform a transcoding process on the first multi-media message to generate at least one second multi-media message, and stores the first multi-media message and the at least one second multi-media message; and an interacting processing module, which is configured to allocate a publishing identifier and send the publishing identifier to the first terminal to inform the first terminal that the message publishing operation is successful, the publishing identifier being used for identifying a storage address of the first multi-media and a storage address of each of the second multi-media messages.

According to a fourth aspect of the invention, it is provided another server, which may comprises:

an identifier obtaining module, which is configured to obtain a publishing identifier carried in a multi-media message play request when receives the multi-media message play request sent by a second terminal in a social network service (SNS) system; a detecting module, which is configured to detect a system parameter of the second terminal; a searching module, which is configured to search, according to the publishing identifier, for a storage address of a first multi-media message and a storage address of at least one second multi-media message which are identified by the publishing identifier; and a message interaction module, which is configured to select, according to the system parameter of the second terminal, one storage address of a multi-media message adapted to the second terminal from the storage address of the first multi-media message and the storage address of the at least one second multi-media message which are obtained by selecting, and send to the second terminal with the storage address of the multi-media message adapted to the second terminal, to make the second terminal play the adapted multi-media message.

According to a fifth aspect of the invention, it is provided a SNS system, which may comprises at least one first terminal and/or at least one second terminal, and further comprises the server provided in the third aspect or the server provided in the fourth aspect.

In the above exemplary embodiments of the present invention, terminals in the SNS system can publish multimedia messages. When the server detects that a first terminal in the SNS system records and publishes a first multi-media message, the server transcodes the first multi-media message and generate at least one second multi-media message, and the server stores the first multi-media message and the at least one second multi-media message. The server uses a publishing identifier to identify the storage address of the first multi-media message and the storage address of each second multi-media message in the at least one second multi-media message, so that message interaction can be performed based on multi-media messages in the SNS system, thereby enriching variety of message contents, improving efficiency of message interaction, and enhancing convenience of social activities.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION OF ILLUSTRATED EMBODIMENTS

The present invention is hereinafter described further in detail with reference to the accompanying drawings so as to make the objective, technical solution, and merits of exemplary embodiments more apparent. The term "exemplary" used throughout this description means "serving as an instance, instance, or illustration," and should not necessarily be construed as preferred or advantageous over other exemplary embodiments. It would be apparent that a person having ordinary skills in the art may obtain other embodiments based on the illustrated exemplary embodiments of the invention without paying any creative work, and these embodiments should also be within the protection scope sought by the present invention.

In various embodiments of the present invention, a SNS system refers to a platform of Internet application service, which establishes a social network for users, for instance: platforms such as a personal space, an interactive website, a forum, etc. The first terminal is any terminal in the SNS system, and may be any one of devices such as a PC (Personal Computer), a mobile phone, a smart phone, a tablet computer, an e-reader, a laptop, an MP3 (Moving Picture Experts Group Audio Layer III) player, an MP4 player, a digital camera, etc. Preferably, the first terminal may have an ability of recording multi-media message, and is able to record and publish a first multi-media message. The second terminal is any one of terminals in the SNS system, and may be any one of devices such as a PC (Personal Computer), a mobile phone, a tablet computer, an e-reader, a laptop, an MP3 (Moving Picture Experts Group Audio Layer III) player, an MP4 player, a digital camera, etc.

Figure 11:
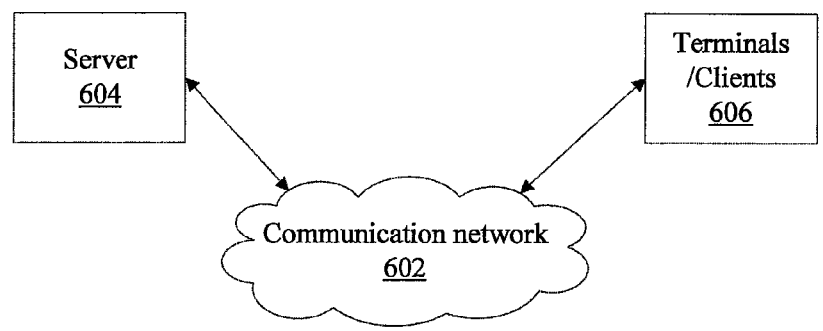
FIG. 11 depicts an exemplary environment incorporating certain disclosed embodiments.

FIG. 11 depicts an exemplary environment 600 incorporating exemplary methods and systems for message interaction in accordance with various disclosed embodiments. As shown in FIG. 11, the environment 600 can include a server 604, terminals 606 (e.g., a first terminal and a second terminal), and a communication network 602. The server 604 and the terminals 606 may be coupled through the communication network 602 for information exchange. Although only one terminals 606 and one server 604 are shown in the environment 600, any number of terminals 606 or servers 604 may be included, and other devices may also be included.

The communication network 602 may include any appropriate type of communication network for providing network connections to the server 604 and terminals 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other client-side computing device.

A server, as used herein, may refer to one or more server computers configured to provide certain server functionalities. A server may also include one or more processors to execute computer programs in parallel.

Figure 7:
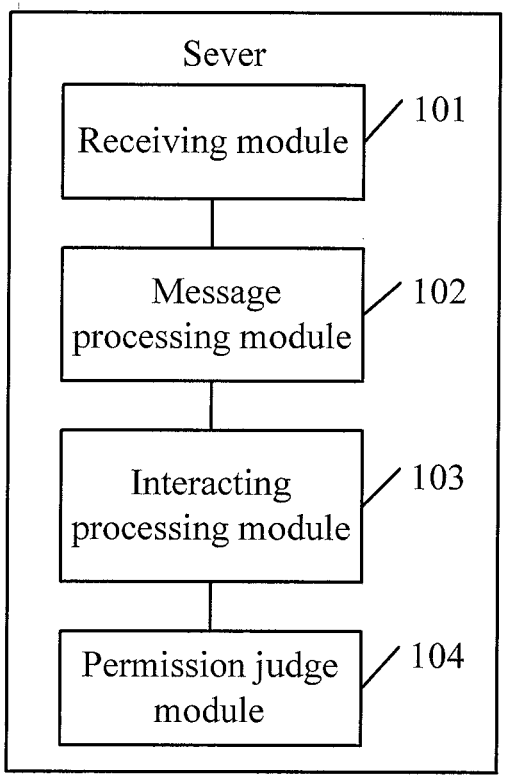
FIG. 7 is a structure diagram of a server provided in yet another embodiment of the present invention.
Figure 12:
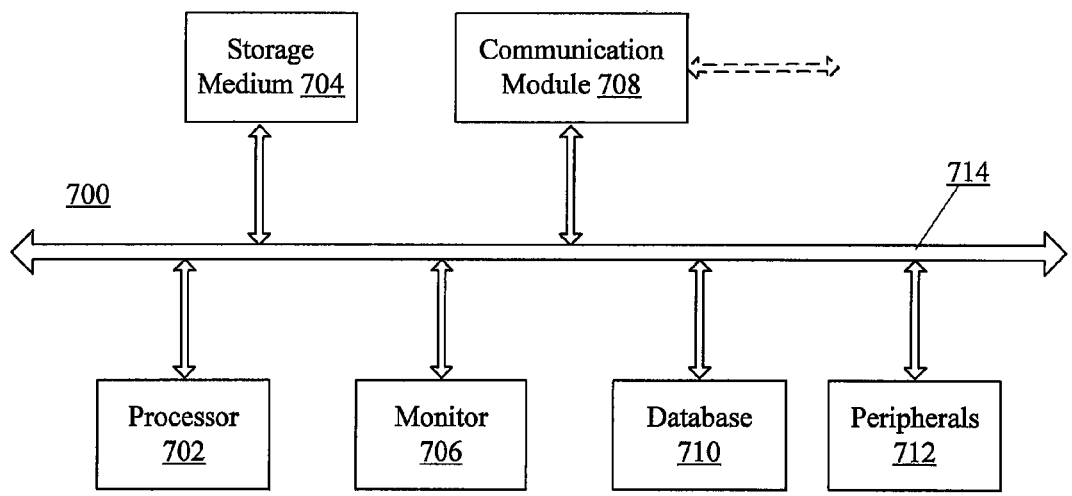
FIG. 12 depicts an exemplary computing system consistent with the disclosed embodiments.

The server 604 and the terminals 606 may be implemented on any appropriate computing platform. FIG. 12 shows a block diagram of an exemplary computing system 700 (or computer system 700) capable of implementing the server 604 and/or the terminals 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes, when executed by the processor 702.

The monitor 706 may include display devices for displaying contents in the computing system 700. The peripherals 712 may include I/O devices such as keyboard and mouse.

Further, the communication module 708 may include network devices for establishing connections through the communication network 602. The database 710 may include one or more databases for storing certain data and for performing certain operations on the stored data.

In operation, the terminals 606 may cause the server 604 to perform certain actions. The server 604 may be configured to provide structures and functions for such actions and operations.

In various embodiments, a terminal involved in the disclosed methods and systems can include the terminals 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods and systems for message interaction. The methods and systems are illustrated in various examples described herein.

Figure 1:
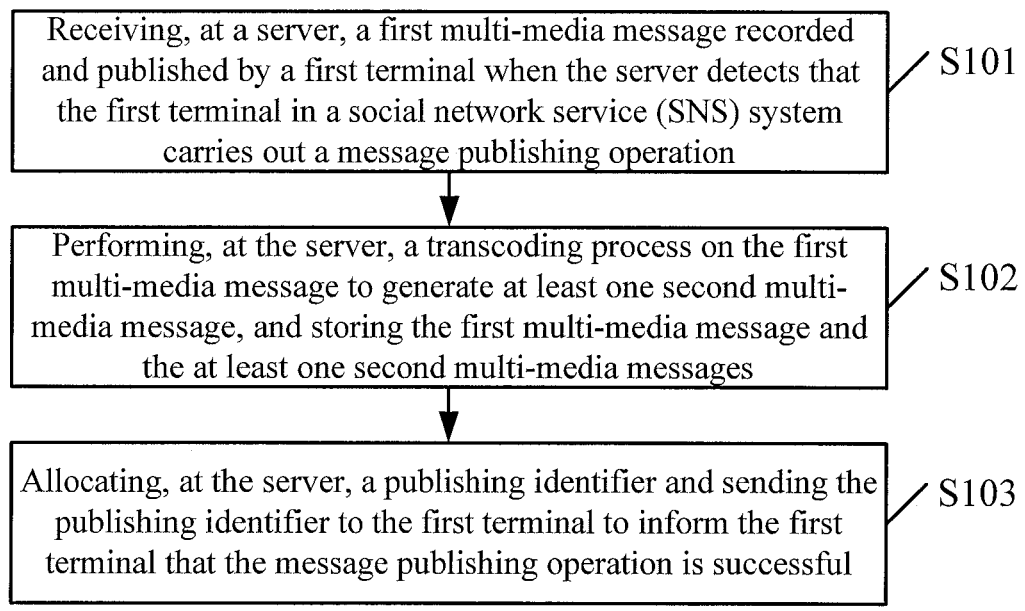
FIG. 1 is a flowchart of a method for message interaction provided in one embodiment of the present invention.
Figure 2:
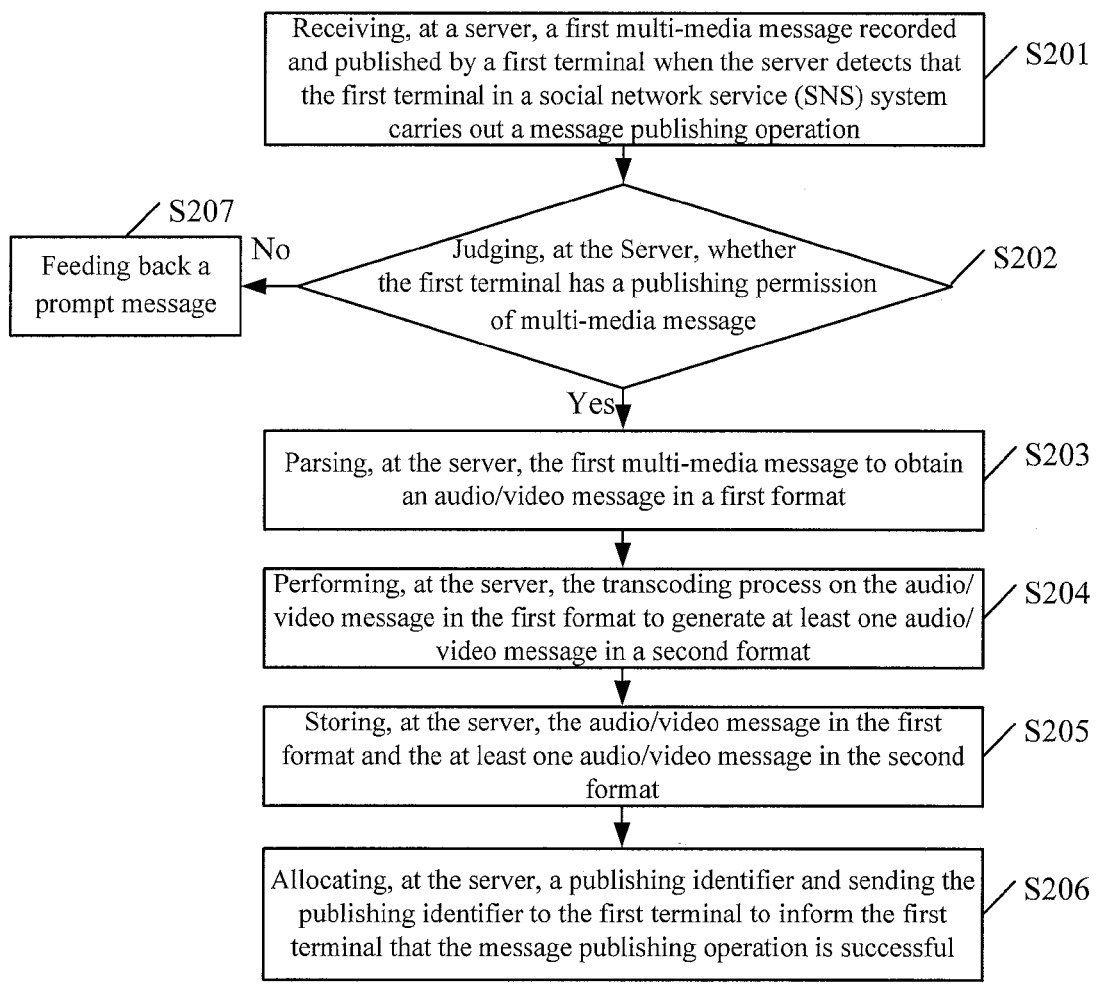
FIG. 2 is a flowchart of a method for message interaction provided in another embodiment of the present invention.
Figure 3:
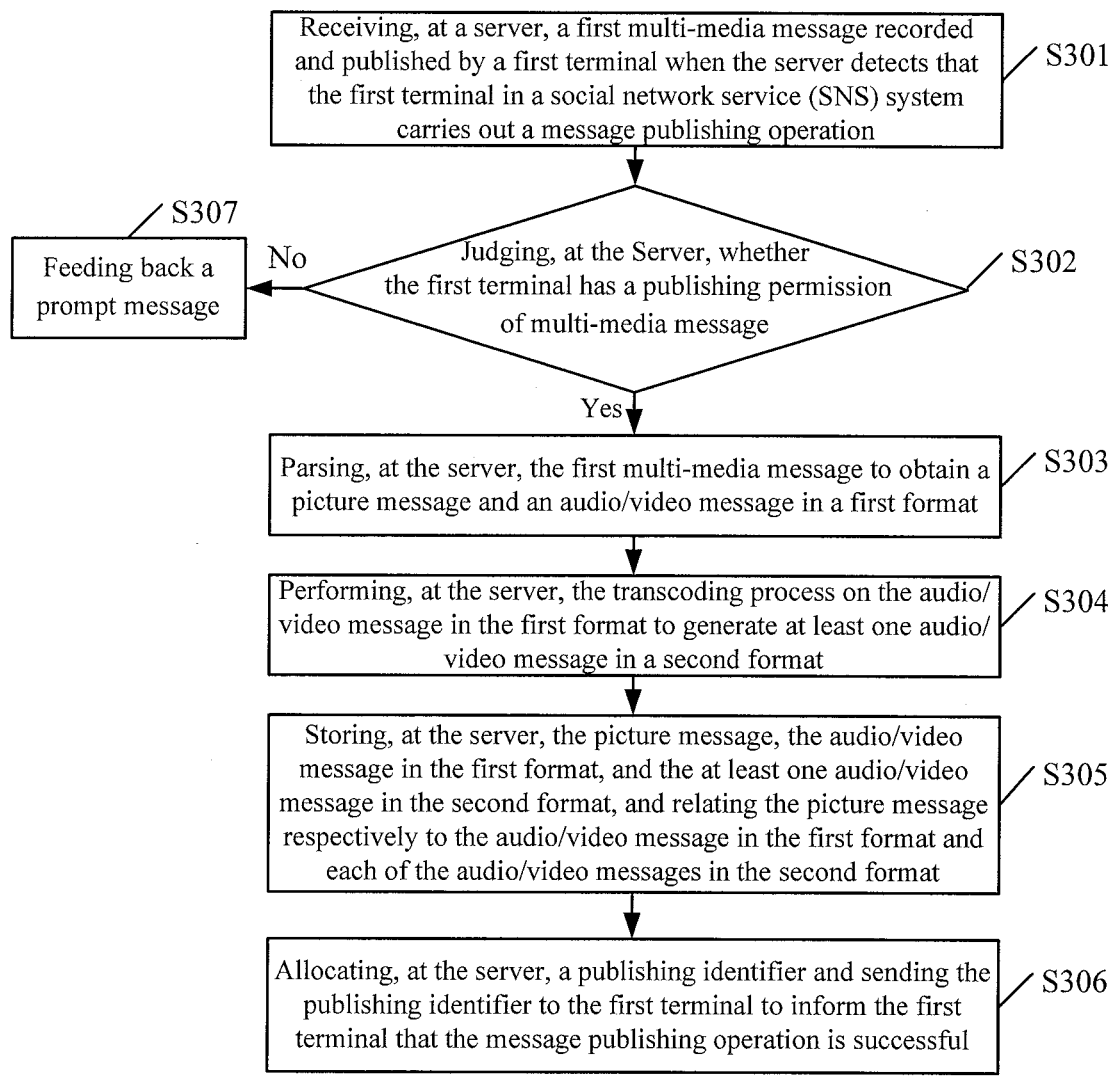
FIG. 3 is a flowchart of a method for message interaction provided in yet another embodiment of the present invention.
Figure 4:
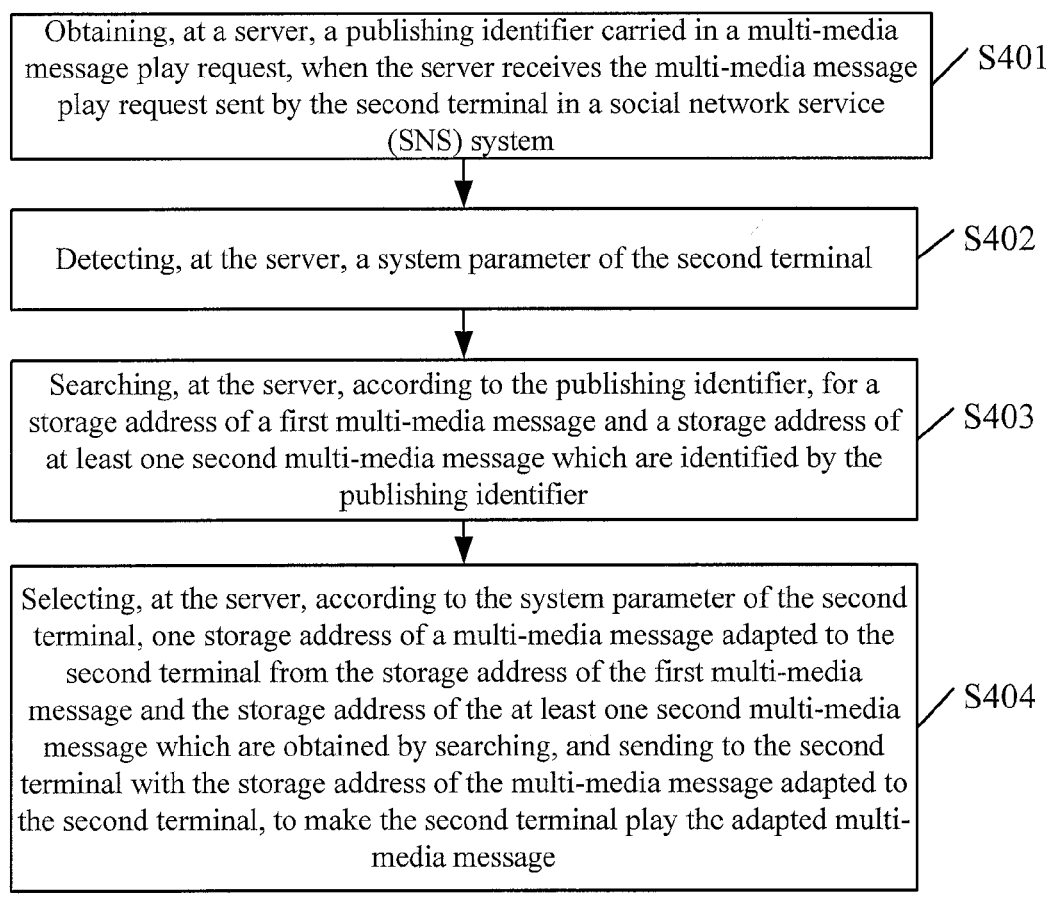
FIG. 4 is a flowchart of a method for message interaction provided in yet another embodiment of the present invention.
Figure 5:
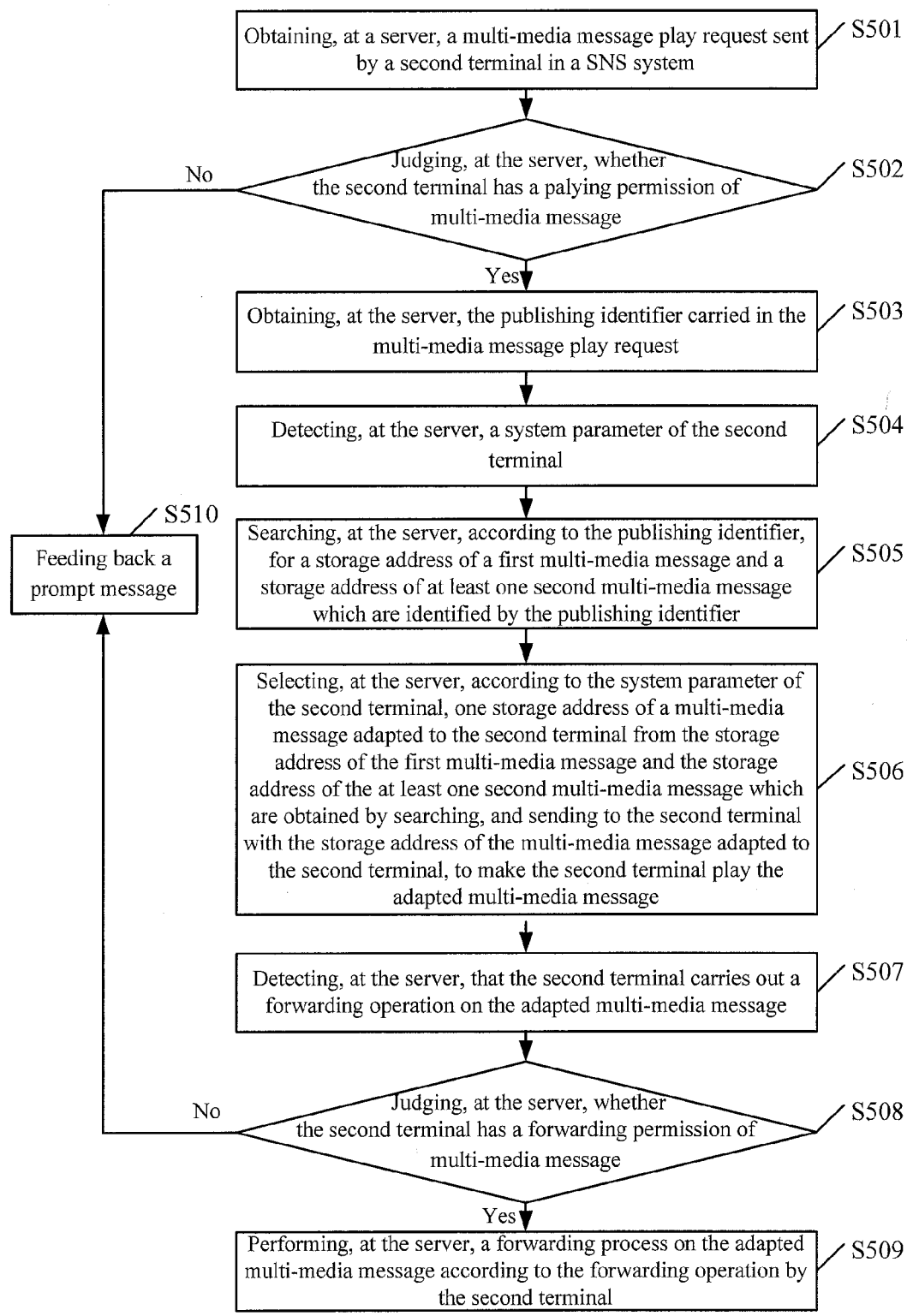
FIG. 5 is a flowchart of a method for message interaction provided in yet another embodiment of the present invention.

Detailed description for the method for message interaction provided in embodiments of the present invention will be given below in conjunction with FIGS. 1-5. It should be noted that embodiments shown in FIGS. 1-3 illustrate the message interaction processes between a server and a first terminal when the first terminal in the SNS system carries out a message publishing operation. Embodiments shown in FIGS. 4 and 5 illustrate the message interaction processes between the server and a second terminal when the second terminal in the SNS system requests to play a multi-media message in the SNS system.

Referring to FIG. 1, it is a flowchart of a method for message interaction provided in an embodiment of the present invention. The method may comprise the steps below: step S101 to step S103.

Step S101 is: receiving, at a server, a first multi-media message recorded and published by a first terminal when the server detects that the first terminal in a social network service (SNS) system carries out a message publishing operation.

Wherein, the message publishing operation may include, but not limited to: a publishing operation carried out when publishing a topic message, a publishing operation carried out when publishing a comment message, a publishing operation carried out when publishing a reply message, a publishing operation carried out when publishing a personal message, and so on. In embodiments of the present invention, the first terminal has a function of recording multi-media message and is able to record and publish the first multi-media message. The function of recording multi-media message at the first terminal may be implemented in the following ways. In the first way, the first terminal contains an application of photo-taking and/or video/audio recording, or an application with a function of photo-taking and/or video/audio recording, and the first terminal is able to make use of the application of photo-taking and/or video/audio recording to record the first multi-media message to publish it. In the second way, the first terminal contains or is connected to an apparatus for photo-taking and/or video/audio recording, and the first terminal is able to make use of the apparatus for photo-taking and/or video/audio recording to record the first multi-media message for publication.

The first multi-media message may include: an audio/video message in a first format. For example, the user of the first terminal records a piece of audio message with the application of photo-taking and/or video/audio recording of the first terminal, and publishes the audio message. Wherein, the first format may be any audio/video format. Specifically, if the first multi-media message includes only an audio message in the first format, then the first format may be AMR (Adaptive Multi-Rate, a kind of audio file format) format, WAV (Waveform Audio Format) format, WMA (Windows Media Audio, a kind of digital audio compression format) format, or ACC (Advanced Audio Coding) format; if the first multi-media message includes only a video message in the first format, then the first format may be RMVB (RM Variable Bit Rate, a kind of streaming video file format) format, AVI (Audio Video Interleaved) format, MP4 format or WMV format. The first multi-media message may also include a picture message and an audio/video message in a first format. For example, a user of the first terminal records a piece of audio message and combines a picture message with the audio message, and publishes the picture message and the audio message together. Wherein, the picture message may be obtained by directly shooting with the application of photo-taking and/or video/audio recording of the first terminal, or also may be obtained by selecting from existing photo albums in the first terminal.

Step S102 is, performing, at the server, a transcoding process on the first multi-media message to generate at least one second multi-media message, and storing the first multi-media message and the at least one second multi-media messages.

When the first multi-media message includes the audio/video message in the first format, the second multi-media message includes the audio/video message in the second format; When the first multi-media message includes the picture message and the audio/video message in the first format, the second multi-media message includes the picture message and the audio/video message in the second format. Wherein, the second format refers to any one of audio/video formats except the first format. It could be understood that the audio/video message in the second format and the audio/video message in the first format may have the same content, even though in different formats.

Due to the problem of terminal compatibility, there may be difference between formats of audio/video messages which can be identified and played by different terminals. For instance, the first terminal publishes a piece of audio message in AMR format, and the second terminal may be unable to parse the AMR format completely because of the problem of compatibility, causing that the second terminal is unable to play the audio/video message in AMR format published by the first terminal or is unable to play the audio/video message in AMR format with relatively good effect. As a result, the user of the second terminal is unable to carry out good social interaction with the user of the first terminal. To solve the problems above, in this step, the server may perform a transcoding process on the audio/video message in the first format which is included in the first multi-media message and generate at least one audio/video message in the second format. For instance, in the example above, the server in this step may transcode the piece of audio message in AMR format published by the first terminal into a piece of audio message in MP3 format and a piece of audio message in WAV format. The server stores the first multi-media message which includes an audio/video message in the first format, and stores the at least one second multi-media message which includes an audio/video message in the second format. After this step, a single piece of audio/video message may contain a variety of formats and is able to adapt to various types of terminals, thereby solving the problem of terminal compatibility and being able to improve the validity of social interaction between users of terminals.

Step S103 is: allocating, at the server, a publishing identifier and sending the publishing identifier to the first terminal to inform the first terminal that the message publishing operation is successful.

Wherein, the publishing identifier is used for identifying a storage address of the first multi-media message and a storage address of each of the second multi-media messages. The publishing identifier may be understood as a view link of a message published by the first terminal. The storage address (like URL (Uniform Resource Locator) address) of the first multi-media message and the storage address (like URL address) of each of the second multi-media message in the at least one multi-media message may be searched for through the publishing identifier. In the implementation, the publishing identifier is used for indicating that the message published by the first terminal is a multi-media message, and the publishing identifier may be a piece of voice key. For instance, the server may allocate a voice key of 25 bytes, and the server may send the publishing identifier to the first terminal. Then, the first terminal may learn that the publishing operation of the first terminal is successful and the first multi-media message published has been uploaded successfully to the server.

In this embodiment of the present invention, terminals in the SNS system can publish multi-media messages. When the server detects that a first terminal in the SNS system records and publishes a first multi-media message, the server transcodes the first multi-media message and generate at least one second multi-media message, and the server stores the first multi-media message and the at least one second multi-media message. The server uses a publishing identifier to identify the storage address of the first multi-media message and the storage address of each second multi-media message in the at least one second multi-media message, so that message interaction can be performed based on multi-media messages in the SNS system, thereby enriching variety of message contents, improving efficiency of message interaction, and enhancing convenience of social activities.

Referring to FIG. 2, it is a flowchart of a method for message interaction provided in another embodiment of the present invention. The method may comprise the steps below: steps S201-S207.

Step S201 is, receiving, at a server, a first multi-media message recorded and published by a first terminal when the server detects that the first terminal in a social network service (SNS) system carries out a message publishing operation.

In this embodiment, for step S201, one may refer to the description of step S101 in the embodiment shown in FIG. 1, which will not be described here to avoid redundancy.

Step S202 is, judging, at the server, whether the first terminal has a publishing permission of multi-media message; if the judgment result is yes, then go into step S203; otherwise, go into step S207, feeding back a prompt message.

The server may configure, in the background, the publishing permissions of multi-media message of each terminal in the SNS system. For instance, in order to prevent the spread of unhealthy messages, the server may configure temporal information to periodically limit the publishing permissions of multi-media message of each terminal in the SNS system, e.g. the server may configure that in the time period of 7:00-12:00 of the day, all of terminals in the SNS system have the publishing permission of multi-media message, and in other time period, none of terminals in the SNS system has the publishing permission of multi-media message. For another instance, in order to prevent certain terminals publishing malicious messages, the server may configure the publishing permission directed to the certain terminals, e.g. the server may configure that in the SNS system, terminal A, terminal B and terminal C do not have the publishing permission of multi-media message, while other terminals in the SNS system may have the publishing permission of multi-media message. It could be understood that, the publishing permission configuration of the server above are just examples, and the server may also determine another strategies of publishing permission configuration according to actual needs.

In this step, the server may perform a publishing permission judgment for the first terminal according to the publishing permission configuration carried out in the background by the server. If the first terminal has the publishing permission of multi-media message, then go into step S203, performing the subsequent processes on the first multi-media message published by the first terminal. If the first terminal does not has the publishing permission of multi-media message, then go into step S207, feeding back the prompt message to the first terminal, to make the first terminal learn that the message publishing operation is failed and the reason of the failure. Then the first terminal may output the prompt message to the user of the first terminal, for instance: the first terminal output a prompt message of "Without publishing permission, multi-media message publishing failed".

Step S203 is, parsing, at the server, the first multi-media message, to obtain an audio/video message in a first format.

In this embodiment, the first multi-media message includes an audio/video message in a first format, namely the message published by the first terminal is an audio/video message in the first format. For instance, the message recorded and published with the first terminal by a user of the first terminal is a piece of audio message in AMR format.

Step S204 is, performing, at the server, a transcoding process on the audio/video message in the first format to generate at least one audio/video message in a second format.

In this embodiment, the second multi-media message may include an audio/video message in the second format. According to the instance in step S203, in this step, the server may perform a transcoding process on a piece of audio message in AMR format which is published by the first terminal. At least one piece of audio message in another format may be obtained, for example: one piece of audio message in MP3 format and one piece of audio message in WAV format may be obtained. After this step, a single piece of audio/video message may contain a variety of formats and is able to adapt to various types of terminals, thereby solving the problem of terminal compatibility and being able to improve the validity of social interaction between users of terminals.

Step S205 is, storing, at the server, the audio/video message in the first format and the at least one audio/video message in the second format.

In this step, according to the type of the message published by the first terminal, the server may store the audio/video message in the first format and the at least one audio/video message in the second format into corresponding network databases. For example, if the type that the message published by the first terminal belongs to is personal message, the server may store the audio/video message in the first format and the at least one audio/video message in the second format into a personal message database of the network. For another example, if the type that the message published by the first terminal belongs to is dynamic message, the server may store the audio/video message in the first format and the at least one audio/video message in the second format into a dynamic message database of the network. It should be noted that, the server records a storage address of the audio/video message in the first format after storing the audio/video message in the first format, and the storage address may be the URL address of the audio/video message in the first format. The server may record a storage address of the audio/video message in the second format after storing the audio/video message in the second format, and the storage address may be the URL address of each audio/video message in the second format.

Step S206 is, allocating, at the server, a publishing identifier and sending the publishing identifier to the first terminal to inform the first terminal that the message publishing operation is successful, the publishing identifier being used for identifying the storage address of the first multi-media message and the storage address of each of the second multi-media messages. In this embodiment, for step S206, one may refer to description of step S103 in the embodiment shown in FIG. 1, which will not be described here to avoid redundancy.

In this embodiment of the present invention, terminals in the SNS system can publish multi-media messages. When the server detects that a first terminal in the SNS system records and publishes a first multi-media message, the server transcodes the first multi-media message and generate at least one second multi-media message, and the server stores the first multi-media message and the at least one second multi-media message. The server uses a publishing identifier to identify the storage address of the first multi-media message and the storage address of each second multi-media message in the at least one second multi-media message, so that message interaction can be performed based on multi-media messages in the SNS system, thereby enriching variety of message contents, improving efficiency of message interaction, and enhancing convenience of social activities.

Referring to FIG. 3, it is a flowchart of a method for message interaction provided in yet another embodiment of the present invention. The method may comprise the steps below: steps S301-S307.

Step S301 is, receiving, at a server, a first multi-media message recorded and published by a first terminal when the server detects that the first terminal in a social network service (SNS) system carries out a message publishing operation.

Step S302 is, judging, at the server, whether the first terminal has a publishing permission of multi-media message; if the judgment result is yes, then go into step S303; otherwise, go into step S307, outputting a prompt message.

In this embodiment, for steps S301 and S302, one may refer to description of steps S201 and S202 in the embodiment shown in FIG. 2, which will not be described here to avoid redundancy.

Step S303 is, parsing, at the server, the first multi-media message, to obtain a picture message and an audio/video message in a first format.

Wherein, the first multi-media message may include a picture message and an audio/video message in the first format, namely, the message published by the first terminal is a picture message and an audio/video message in the first format. For example, a user of the first terminal may record a piece of audio message in AMR format, combine a picture message with the audio message, and publish the picture message and the audio message in AMR format together as the first multi-media message.

Step S304 is, performing, at the server, a transcoding process on the audio/video message in the first format to generate at least one audio/video message in a second format. In this embodiment, for step S304, one may refer to description of step S204 in the embodiment shown in FIG. 2, which will not be described here to avoid redundancy.

Step S305 is, storing, at the server, the picture message, the audio/video message in the first format, and the at least one audio/video message in the second format, and relating the picture message respectively to the audio/video message in the first format and each of the audio/video messages in the second format.

In this embodiment, the second multi-media message may include a picture message and audio/video messages in the second format which are related to the picture message. In this step, the picture may be related to each audio/video message in the second format which is generated by transcoding in step S304. The picture and one audio/video messages in the second format may form a second multi-media message. In this step, the picture relates, respectively, to the audio/video message in the first format and each of the audio/video messages in the second format, indicating that the picture and the audio/video messages related to the picture are messages published together.

Step S306 is, allocating, at the server, a publishing identifier and sending the publishing identifier to the first terminal to inform the first terminal that the message publishing operation is successful, the publishing identifier being used for identifying the storage address of the first multi-media message and the storage address of each of the second multi-media messages. In this embodiment, for step S306, one may refer to the description of step S206 in the embodiment shown in FIG. 2, which will not be described here to avoid redundancy.

In this embodiment of the present invention, terminals in the SNS system can publish multi-media messages. When the server detects that a first terminal in the SNS system records and publishes a first multi-media message, the server transcodes the first multi-media message and generate at least one second multi-media message, and the server stores the first multi-media message and the at least one second multi-media message. The server uses a publishing identifier to identify the storage address of the first multi-media message and the storage address of each second multi-media message in the at least one second multi-media message, so that message interaction can be performed based on multi-media messages in the SNS system, thereby enriching variety of message contents, improving efficiency of message interaction, and enhancing convenience of social activities.

Referring to FIG. 4, it is a flowchart of a method for message interaction provided in yet another embodiment of the present invention. The method may comprise the steps below, steps S401-S404.

Step S401 is, obtaining, at a server, a publishing identifier carried in a multi-media message play request, when the server receives the multi-media message play request sent by a second terminal in a SNS system.

Wherein, the second terminal may send the multi-media message play request in the information page provided by the SNS system, the information page including but not limited to: a friend-trends information page, a relevant-to-me information page, a personal information page, and so on. When the information page provided by the SNS system contains a multi-media message, the publishing identifier related to the multi-media message will be displayed. For example, the first terminal in the SNS system may publish a first multi-media message which contains a piece of audio message in AMR format. Then, by adopting the message interaction processes of embodiments shown in FIGS. 1 and 2, the server allocates a publishing identifier. In the information page provided by the SNS system, the audio message in AMR format which is published by the first terminal will not be directly displayed, and what is displayed is the publishing identifier allocated by the server. For another example, the first terminal in the SNS system may publish a multi-media message, the multi-media message may contain a picture message and a piece of audio message in AMR format. Then, by adopting the message interaction processes of embodiments shown in FIGS. 1 and 2, the server allocates a publishing identifier. In the information page provided by the SNS system, the audio message in AMR format which is published by the first terminal will not be directly displayed, and what is displayed is the picture message published by the first terminal and the publishing identifier allocated by the server in the picture message. A user of the second terminal may, by clicking the publishing identifier in the information page of the SNS system, initiate a play request for the multi-media message identified by the publishing identifier. The second terminal may send the multi-media message play request to the server, the multi-media message play request carrying the publishing identifier of the multi-media message which is requested to be played.

Step S402 is, detecting, at the server, a system parameter of the second terminal.

Wherein, the system parameters of the second terminal may include: the terminal type of the second terminal, the player version of the second terminal, the version of the SNS system used by the second terminal, the browser version of the second terminal, and one or more parameters of plugins or the like in the second terminal. In this step, the server may real-timely monitor the system parameter of the second terminal, and also may require the second terminal to take the initiative to report the system parameter of the second terminal.

Step S403 is, searching, at the server, according to the publishing identifier, for a storage address of a first multi-media message and a storage address of at least one second multi-media message which are identified by the publishing identifier.

According to the description of embodiments shown in FIGS. 1-3, the server will allocate a publishing identifier when the first multi-media message is published directed to the first terminal in the SNS system (namely any one of terminals in the SNS system), the publishing identifier being used for identifying the storage address of the first multi-media message and the storage address of each of the second multi-media message in the at least one second multi-media message. The publishing mark may be understood as a view link of messages published by the first terminal. Storage address (like URL address) of the first multi-media message, and storage address (like URL address) of each of the second multi-media message in the at least one multi-media message may be searched for by the publishing mark. In this step, according to the publishing identifier obtained from the multi-media message play request in step S401, the server may search for the storage address of the first multi-media message and the storage address of the at least one second multi-media message which are identified by the publishing identifier.

Step S404 is, selecting, at the server, according to the system parameter of the second terminal, one storage address of a multi-media message adapted to the second terminal from the storage address of the first multi-media message and the storage address of the at least one second multi-media message which are obtained by searching, and sending to the second terminal with the storage address of the multi-media message adapted to the second terminal, to make the second terminal play the adapted multi-media message.

In this step, according to the system parameters of the second terminal detected in step S402, the server may select an adapted multi-media message for the second terminal and feed the URL address of the adapted multi-media message back to the second terminal. On the basis of URL address of the adapted multi-media message, the second terminal obtains the adapted multi-media message from a corresponding database and plays the adapted multi-media message. In the implementation, the procedure of the server selecting the adapted multi-media message for the second terminal may include but not limited to: if the terminal type of the second terminal is PC and the second terminal contains a browser supporting HTML5 technology, then it is selected a multi-media message suitable for the browser of the second terminal to play; if the terminal type of the second terminal is PC and the second terminal does not contain a browser supporting HTML5 technology but contains a FLASH plugin, then it is selected a multi-media message suitable for the FLASH plugin of the second terminal to play; if the terminal type of the second terminal is mobile terminal and the SNS system used by the second terminal is in V2.0 version (namely the new version), then it is selected a multi-media message suitable for the player of the second terminal to play; and if the terminal type of the second terminal is mobile terminal and the SNS system used by the second terminal is in V1.0 version (namely the old version), then it is selected a multi-media message suitable for the web browser of the second terminal to play.

In this embodiment of the present invention, terminals in the SNS system can play multi-media messages. The server selects an adapted multi-media message for the second terminal according to the publishing identifier carried in the multi-media message play request when it receives the multi-media message play request sent by the second terminal in the SNS system, and feeds back the storage address of the adapted multi-media message to the second terminal to make the second terminal be able to play the adapted multi-media message in a relatively good effect, improving the validity of social interaction in the SNS system. Meanwhile, since message interaction may be performed based on multi-media message in the SNS system, variety of message contents is enriched, efficiency of message interaction is improved, and convenience of social activities is enhanced.

Referring to FIG. 5, it is a flowchart of a method for message interaction provided in yet another embodiment of the present invention; and the method may comprise the steps below, steps S501-S510.

Step S501 is, obtaining, at a server, a multi-media message play request sent by a second terminal in a SNS system.

Wherein, the second terminal may send the multi-media message play request in the information page provided by the SNS system, the information page including but not limited to: a friend-trends information page, an relevant-to-me information page, a personal information page and so on.

If the information page provided by the SNS system includes a multi-media message, the publishing identifier corresponded to the multi-media message will be displayed in the information page of the SNS system. A user of the second terminal may initiate a play request of the multi-media message identified by the publishing identifier by clicking the publishing identifier in the information page of the SNS system Then, the second terminal sends the multi-media message play request to the server, the multi-media message play request carrying the publishing identifier of the multi-media message which is requested to be played.

Step S502 is, judging, at the server, whether the second terminal has a playing permission of multi-media message; if the judgment result is yes, then going into step S503; otherwise, going into step S510, feeding back a prompt message.

In this step, the process of the server performing the playing permission judgment may include: firstly, obtaining an user information (such as: an user identity) of the publisher by which the multi-media message is requested to play, and an user information (such as: an user identity) corresponding to the second terminal; secondly, judging the SNS relationship between the publisher and the user corresponding to the second terminal. The SNS relationship may include: a self-relationship, a friend relationship, a stranger relationship, and so on. If the SNS relationship between the publisher and the user corresponding to the second terminal is a self-relationship, that is, the publisher is the user corresponding to the second terminal, it could be confirmed that the second terminal has the playing permission of multi-media message, and go into step S503. If the SNS relationship between the publisher and the user corresponding to the second terminal is a friend relationship, it could be confirmed that the second terminal has the playing permission of multi-media message, and go into step S503. If the SNS relationship between the publisher and the user corresponding to the second terminal is neither a self-relationship nor a friend relationship, it could be confirmed that the second terminal does not have the playing permission of multi-media message, and go into step S510. In this case, the server may feed a prompt message back to the second terminal to make the second terminal learn that the multi-media message play request is failed and the reason of the failure. The second terminal may output the prompt message to the user of the second terminal, e.g. the second terminal may output a prompt message of "Without playing permission, multi-media message play request failed".

Step S503 is, obtaining, at the server, the publishing identifier carried in the multi-media message play request.

As described above, when the second terminal initiates the multi-media message play request, the multi-media message play request carries the publishing identifier of the multi-media message which is requested to be played. In this step, the server may parse the multi-media message play request to obtain the carried publishing identifier.

Step S504 is, detecting, at the server, a system parameter of the second terminal.

Step S505 is, searching, at the server, according to the publishing identifier, for a storage address of a first multi-media message and a storage address of at least one second multi-media message which are identified by the publishing identifier.

Step S506 is, selecting, at the server, according to the system parameter of the second terminal, one storage address of a multi-media message adapted to the second terminal from the storage address of the first multi-media message and the storage address of the at least one second multi-media message which are obtained by searching, and sending to the second terminal with the storage address of the multi-media message adapted to the second terminal, to make the second terminal play the adapted multi-media message.

In this embodiment, for steps S504-S506, one may refer to description of steps S402-S404 in the embodiment shown in FIG. 4, which will not be described here to avoid redundancy.

Step S507 is, detecting, at the server, that the second terminal carries out a forwarding operation on the adapted multi-media message.

Step S508 is, judging, at the server, whether the second terminal has a forwarding permission of multi-media message, if the judgment result is yes, then going into step S509; otherwise, going into step S510, feeding back a prompt message.

In this step, the forwarding permission judgment performed at the server may include judge procedures in the two aspects below. Judge procedure in the first aspect is that: the server judges that whether the SNS relationship between the user of the second terminal and the publisher of the adapted multi-media message is a self-relationship or a friend relationship.

For the judge procedure of this aspect, one may refer to the judge procedure described in step S502, which will not be described here to avoid redundancy.

If the judgment result of the first aspect is that the SNS relationship between the user of the second terminal and the publisher of the adapted multi-media message is neither a self-relationship nor a friend relationship, then the second terminal does not have the forwarding permission of multi-media message, and go into step S510. If the judgment result of the first aspect is that the SNS relationship between the user of the second terminal and the publisher of the adapted multi-media message is a self-relationship or a friend relationship, then go into the judgment in the second aspect.

Judge procedure in the second aspect is that: the server judges whether the second terminal has the publishing permission of multi-media message. Because the server may configure, in the background, the publishing permissions of multi-media message of each terminal in the SNS system, the server may perform a publishing permission judgment on the second terminal according to the publishing permission configuration carried out by the server in the background. If the judgment result in the second aspect is that the second terminal has the publishing permission of multi-media message, then in conjunction with the judgment result of the first aspect, the second terminal has the forwarding permission of multi-media message, and it may go into step S509. If the judgment result in the second aspect is that the second terminal does not have the publishing permission of multi-media message, then it may go into step S510.

In this embodiment, when goes to step S510, the server feeds the prompt message back to the second terminal to make the second terminal learn that the forwarding operation of the multi-media message is failed and the reason of the failure. The second terminal may output the prompt message to the user of the second terminal. For example, the second terminal may output a prompt message of "Without forwarding permission, multi-media message forwarding failed".

Step S509 is, performing, at the server, a forwarding process on the adapted multi-media message according to the forwarding operation by the second terminal.

It should be noted that, the forwarding operation performed by the second terminal on the adapted multi-media message may be understood as a publishing operation performed by the second terminal on the adapted multi-media message. In this step, for the procedure that the server performs the forwarding process on the adapted multi-media message, one may refer to the process performed by the server when any one of terminals in the SNS system publishes a multi-media message in embodiments shown in FIGS. 1-3, which will not be described here to avoid redundancy.

In this embodiment of the present invention, terminals in the SNS system can play multi-media messages. The server selects an adapted multi-media message for the second terminal according to the publishing identifier carried in the multi-media message play request when it receives the multi-media message play request sent by the second terminal in the SNS system, and feeds back the storage address of the adapted multi-media message to the second terminal to make the second terminal be able to play the adapted multi-media message in a relatively good effect, improving the validity of social interaction in the SNS system. Meanwhile, since message interaction may be performed based on multi-media message in the SNS system, variety of message contents is enriched, efficiency of message interaction is improved, and convenience of social activities is enhanced.

Detailed description for the structure of the server provided in embodiments of the present invention will be given below in conjunction with FIGS. 6-10. It should be noted that, the server described in embodiments shown in FIGS. 6-8 may be used in the execution of the message interaction processes shown in FIGS. 1-3. The server described in embodiments shown in FIGS. 9-10 may be used in the message interaction processes shown in FIGS. 4-5.

Figure 6:
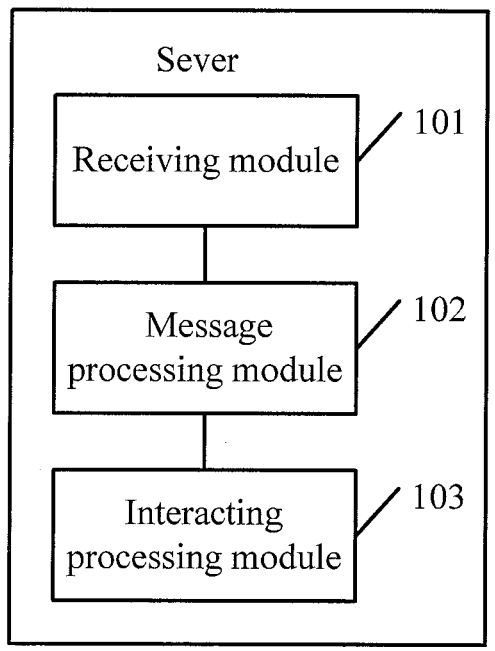
FIG. 6 is a structure diagram of a server provided in yet another embodiment of the present invention.

Referring to FIG. 6, it is a structure diagram of a server provided in yet another embodiment of the present invention. The server may comprise: a receiving module 101, a message processing module 102 and an interacting processing module 103.

The receiving module 101 is configured to receive a first multi-media message recorded and published by a first terminal when the server detects that the first terminal in a social network service (SNS) system carries out a message publishing operation.

Wherein, the message publishing operation may include, but not limited to: a publishing operation carried out when publishing a topic message, a publishing operation carried out when publishing a comment message, a publishing operation carried out when publishing a reply message, a publishing operation carried out when publishing a personal message, and so on. In various embodiments of the present invention, the first terminal may have a function of recording multi-media message and is able to record and publish the first multi-media message. The function of recording multi-media message of the first terminal may be implemented in the following ways: in the first way, the first terminal may contain an application of photo-taking and/or video/audio recording or an application with a function of photo-taking and/or video/audio recording, and the first terminal is able to make use of the application of photo-taking and/or video/audio recording to record the first multi-media message for publication. In the second way, the first terminal may contains or be connected to an apparatus for photo-taking and/or video/audio recording, and the first terminal is able to make use of the apparatus for photo-taking and/or video/audio recording to record the first multi-media message for publication. The first multi-media message may include an audio/video message in a first format and may also include a picture message and an audio/video message in a first format. The picture message may be directly shot to obtain by the application of photo-taking and/or video/audio recording of the first terminal, or may also be selected from existing photo albums of the first terminal.

The message processing module 102 is configured to perform a transcoding process on the first multi-media message to generate at least one second multi-media message, and to store the first multi-media message and the at least one second multi-media message.

If the first multi-media message includes the audio/video message in the first format, the second multi-media message may include the audio/video message in the second format. If the first multi-media message includes the picture message and the audio/video message in the first format, the second multi-media message may include the picture message and the audio/video message in the second format. Wherein, the second format refers to any one of audio/video formats except the first format. It should be understood that the audio/video message in the second format and the audio/video message in the first format has the same content, even though in different formats.

Due to the problem of terminal compatibility, there may be difference between formats of audio/video messages which can be identified and played by different terminals, causing that users of different terminals are unable to carry out good social interaction. To solve the problem above, the message processing module 102 may perform a transcoding process on the audio/video message in the first format which is included in the first multi-media message, and generate at least one audio/video message in the second format. After the transcoding process by the message processing module 102, a single piece of audio/video message may contain a variety of formats and is able to adapt to various types of terminals, thereby solving the problem of terminal compatibility and improving the validity of social interaction between users of terminals.

The interacting processing module 103 is configured to allocate a publishing identifier and send the publishing identifier to the first terminal to inform the first terminal that the message publishing operation is successful, the publishing identifier being used for identifying a storage address of the first multi-media and a storage address of each of the second multi-media messages.

Wherein, the publishing identifier may be understood as a view link of messages published by the first terminal. Storage address (like URL address) of the first multi-media message and storage address (like URL address) of each of the second multi-media message in the at least one multi-media message may be searched for with the publishing identifier. In the implementation, the publishing identifier is used for indicating that the message published by the first terminal is a multi-media message, and the publishing identifier may be a piece of voice key. The interacting processing module 103 feeds the publishing identifier back to the first terminal, then the first terminal may learn that the publishing operation of the first terminal is successful and the first multi-media message published has been uploaded successfully to the server.

In this embodiment of the present invention, terminals in the SNS system can publish multi-media messages. The server may transcode a first multi-media message, generate at least one second multi-media message when the server detects that the first terminal in the SNS system records and publishes the first multi-media message, and store the first multi-media message and the at least one second multi-media message. The server may use a publishing identifier to identify the storage address of the first multi-media message and the storage address of each second multi-media message in the at least one second multi-media message. Thus, message interaction can be performed based on multi-media message in the SNS system, variety of message contents is improved, and efficiency of message interaction and convenience of social activities are enhanced.

Referring to FIG. 7, it is a structure diagram of a server provided in yet another embodiment of the present invention. The server may comprise: a receiving module 101, a message processing module 102, an interacting processing module 103 and a permission judge module 104. Wherein, for structures of the receiving module 101, the message processing module 102, and the interacting processing module 103, one may refer to the related description of the embodiment shown in FIG. 6, which will not be described here to avoid redundancy.

The permission judge module 104 is configured to judge whether the first terminal has a publishing permission of multi-media message, and to inform the message processing module to handle the first multi-media message if the first terminal has the publishing permission of multi-media message.

The server may configure, in the background, the publishing permissions of multi-media message of each terminal in the SNS system. For instance, in order to prevent the spread of unhealthy message, the server may configure temporal information to periodically limit the publishing permissions of multi-media message of each terminal in the SNS system, e.g. the server may configure that in the time period of 7:00-12:00 of the day, each terminal in the SNS system all has the publishing permission of multi-media message and in other time period, all the terminal in the SNS system does not has the publishing permission of multi-media message. For another example, in order to prevent certain terminals publishing malicious messages, the server may configure the publishing permission contraposing the certain terminals, e.g. the server may configure that in the SNS system, terminal A, terminal B, and terminal C do not have the publishing permission of multi-media message, while other terminals in the SNS system have the publishing permission of multi-media message. It could be understood that, the publishing permission configuration of the above servers is just an example, and the server may also determine another strategies of publishing permission configuration according to actual needs.

The permission judge module 104 may perform a publishing permission judgment for the first terminal according to the publishing permission configuration carried out in the background by the server and inform the message processing module 102 to handle the first multi-media message if the first terminal has the publishing permission of multi-media message. It should be noted that, if the first terminal does not has the publishing permission of multi-media message, the permission judge module 104 may further feed a prompt message back to the first terminal, to make the first terminal learn that the message publishing operation is failed and the reason of the failure. Then the first terminal may output the prompt message to the user of the first terminal, e.g. the first terminal output a prompt message of "Without publishing permission, multi-media message publishing failed".

In this embodiment of the present invention, terminals in the SNS system can publish multi-media messages. When the server detects that a first terminal in the SNS system records and publishes a first multi-media message, the server transcodes the first multi-media message and generate at least one second multi-media message, and the server stores the first multi-media message and the at least one second multi-media message. The server uses a publishing identifier to identify the storage address of the first multi-media message and the storage address of each second multi-media message in the at least one second multi-media message, so that message interaction can be performed based on multi-media messages in the SNS system, thereby enriching variety of message contents, improving efficiency of message interaction, and enhancing convenience of social activities.

Figure 8A:
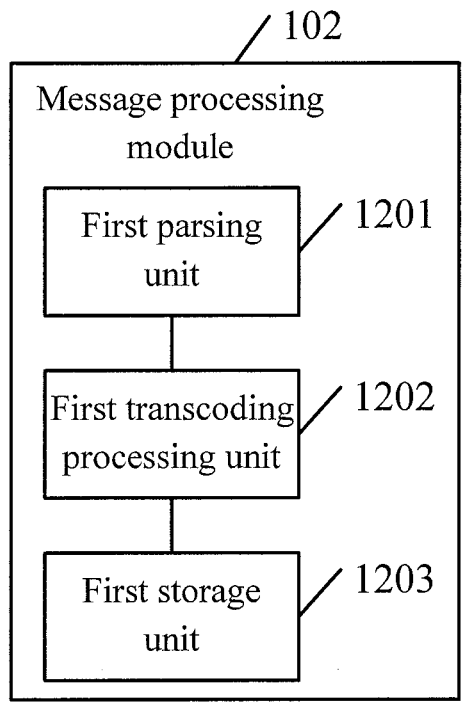
FIG. 8a is a structure diagram of a message processing module provided in yet another embodiment of the present invention.

Referring to FIG. 8a, it is a structure diagram of a message processing module provided in yet another embodiment of the present invention. The message processing module 102 may comprise: a first parsing unit 1201, a first transcoding processing unit 1202, and a first storage unit 1203.

A first parsing unit 1201 is configured to parse the first multi-media message to obtain an audio/video message in a first format.

In this embodiment, the first multi-media message includes the audio/video message in the first format, namely, the message published by the first terminal is the audio/video message in the first format. Here, the first format may be any audio/video format. Specifically, if the first multi-media message includes only an audio message in the first format, the first format may be AMR format, WAV format, WMA format, or ACC format. If the first multi-media message includes only a video message in the first format, the first format may be RMVB format, AVI format, MP4 format, or WMV format.

The first transcoding processing unit 1202 is configured to perform a transcoding process on the audio/video message in the first format to generate at least one audio/video message in a second format.

In this embodiment, the second multi-media message may include an audio/video message in the second format. After the first transcoding processing unit 1202 performing the transcoding process, a single piece of audio/video message may contain a variety of formats and is able to adapt to various types of terminals, solving the problem of terminal compatibility and being able to improve the validity of social interaction between users of terminals.

The first storage unit 1203 is configured to store the audio/video message in the first format and the at least one audio/video message in the second format.

The first storage unit 1203 may, according to the type of the message published by the first terminal, store the audio/video message in the first format and the at least one audio/video message in the second format into corresponding network databases. For example, if the type of the message published by the first terminal is a personal message, the server may store the audio/video message in the first format and the at least one audio/video message in the second format into a personal message database of the network. For another example, if the type of the message published by the first terminal is a dynamic message, the server stores the audio/video message in the first format and the at least one audio/video message in the second format into a dynamic message database of the network. It should be noted that the first storage unit 1203 may record a storage address of the audio/video message in the first format after storing the audio/video message in the first format, and the storage address may be the URL address of the audio/video message in the first format. The first storage unit 1203 may record a storage address of the audio/video message in the second format after storing the audio/video message in the second format, and the storage address may be the URL address of each audio/video message in the second format.

In this embodiment of the present invention, terminals in the SNS system can publish multi-media messages. The server may transcode the first multi-media message recorded and published by the first terminal to generate at least one second multi-media message, and store the first multi-media message and the at least one second multi-media message. Therefore, not only the problem of compatibility between terminals can be solved and the validity of social interaction between users of terminals can be improved, but also message interaction can be performed based on multi-media messages in the SNS system, thereby enriching variety of message contents, improving efficiency of message interaction, and enhancing convenience of social activities.

Figure 8B:
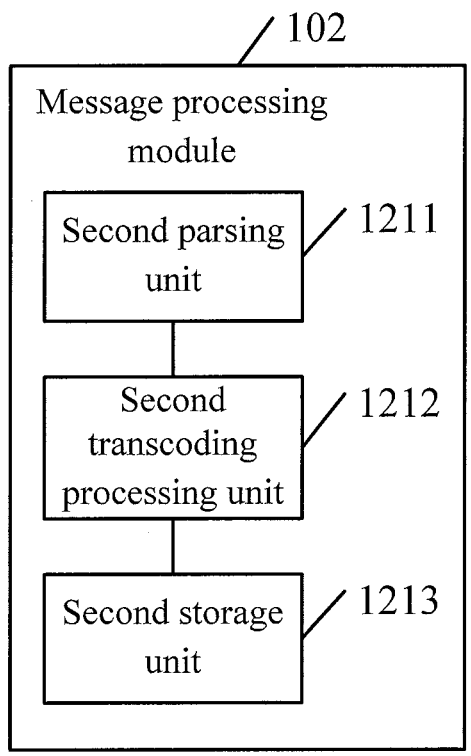
FIG. 8b is a structure diagram of a message processing module provided in yet another embodiment of the present invention.

Referring to FIG. 8b, it is a structure diagram of a message processing module provided in yet another embodiment of the present invention. The message processing module 102 may comprise: a second parsing unit 1211, a second transcoding processing unit 1212 and a second storage unit 1213.

The second parsing unit 1211 is configured to parse the first multi-media message to obtain a picture message and an audio/video message in a first format.

In this embodiment, the first multi-media message may include a picture message and an audio/video message in the first format, namely, the message published by the first terminal is a picture message and an audio/video message in the first format. For example, a user of the first terminal may record a piece of audio message in AMR format and combines a picture message with the audio message, and publish the picture message and the audio message in AMR format together as the first multi-media message.

The second transcoding processing unit 1212 is configured to perform a transcoding process on the audio/video message in the first format to generate at least one audio/video message in a second format.

The second storage unit 1213 is configured to store the picture message, the audio/video message in the first format, and the at least one audio/video message in the second format; and is configured to associate the picture message to the audio/video message in the first format and each of the audio/video messages in the second format, respectively.

In this embodiment, the second multi-media message may include the picture message and the audio/video messages in the second format related to the picture message. The second storage unit 1213 relates the picture to the audio/video messages in the second format which is transcoded to generate by the second transcoding processing unit 1212. Then, the picture and one audio/video messages in the second format related to the picture may form a second multi-media message. The picture relates respectively to the audio/video message in the first format and each of the audio/video message in the second format, indicating that the picture and the audio/video message related to the picture are messages are published together. In this embodiment of the present invention, terminals in the SNS system can publish multi-media messages. The server may transcode the first multi-media message recorded and published by the first terminal to generate at least one second multi-media message, and store the first multi-media message and the at least one second multi-media message. Therefore, not only the problem of compatibility between terminals can be solved and the validity of social interaction between users of terminals can be improved, but also message interaction can be performed based on multi-media messages in the SNS system, thereby enriching variety of message contents, improving efficiency of message interaction, and enhancing convenience of social activities.

It should be noted that, the structures and the functions of the server provided by embodiments shown in FIGS. 6-8 may be realized by the methods of embodiments shown in FIGS. 1-3. For the specific implementation, one may refer to the description of the above embodiments of the methods, which will not be described here to avoid redundancy.

Figure 9:
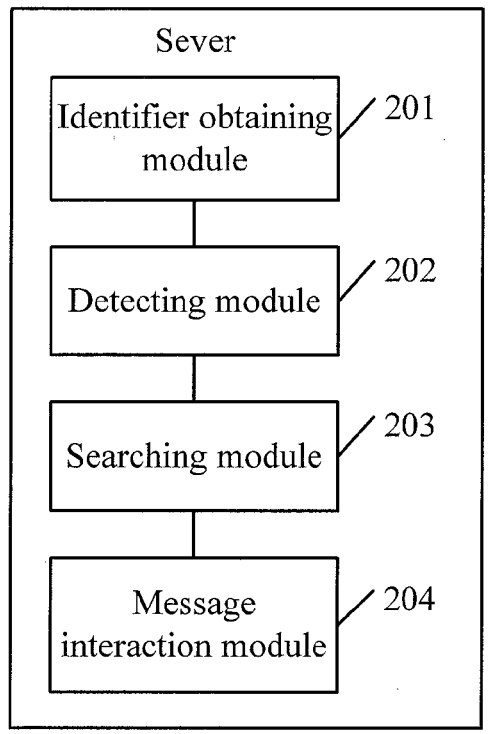
FIG. 9 is a structure diagram of a server provided in yet another embodiment of the present invention.

Referring to FIG. 9, it is a structure diagram of a server provided in yet another embodiment of the present invention. The server may comprise: an identifier obtaining module 201, a detecting module 202, a searching module 203, and a message interaction module 204.

The identifier obtaining module 201 is configured to obtain a publishing identifier carried in a multi-media message play request when receiving the multi-media message play request sent by a second terminal in a social (SNS) system.

Wherein, the second terminal may send the multi-media message play request in an information page provided by the SNS system, the information page including but not limited to: a friend-trends information page, a related-to-me information page, a personal information page, and so on. If the information page provided by the SNS system includes a multi-media message, the publishing identifier corresponded to the multi-media message will be displayed in the information page of the SNS system. Then, a user of the second terminal may initiate a play request of the multi-media message identified by the publishing identifier by clicking the publishing identifier in the information page of the SNS system, and the second terminal may send the multi-media message play request to the server, the multi-media message play request carrying the publishing identifier of the multi-media message which is requested to be played. The identifier obtaining module 201 then obtains the publishing identifier carried in the multi-media message play request.

The detecting module 202 is configured to detect a system parameter of the second terminal.

Wherein, the system parameters of the second terminal may include: the terminal type of the second terminal, the player version of the second terminal, the version of the SNS system used by the second terminal, the browser version of the second terminal, and one or more parameters of plugins and the like in the second terminal. The detecting module 202 may real-timely monitor the system parameter of the second terminal, and also may require the second terminal to take the initiative to report the system parameter of the second terminal.

The searching module 203 is configured to search, according to the publishing identifier, for a storage address of a first multi-media message and a storage address of at least one second multi-media message which are identified by the publishing identifier.

The message interaction module 204 is configured to select, according to the system parameter of the second terminal, a storage address of a multi-media message adapted to the second terminal from the storage address of the first multi-media message and the storage address of the at least one second multi-media message which are obtained by selecting, and send to the second terminal with the storage address of the multi-media message adapted to the second terminal, so as to make the second terminal play the adapted multi-media message.

In this embodiment of the present invention, terminals in the SNS system can play multi-media messages. The server selects an adapted multi-media message for the second terminal according to the publishing identifier carried in the multi-media message play request when receives the multi-media message play request sent by the second terminal in the SNS system, and feeds back the storage address of the adapted multi-media message to the second terminal to make the second terminal be able to play the adapted multi-media message in a relatively good effect, improving the validity of social interaction in the SNS system. Meanwhile, since message interaction may be performed based on multi-media message in the SNS system, variety of message contents is enriched, efficiency of message interaction is improved, and convenience of social activities is enhanced.

Figure 10:
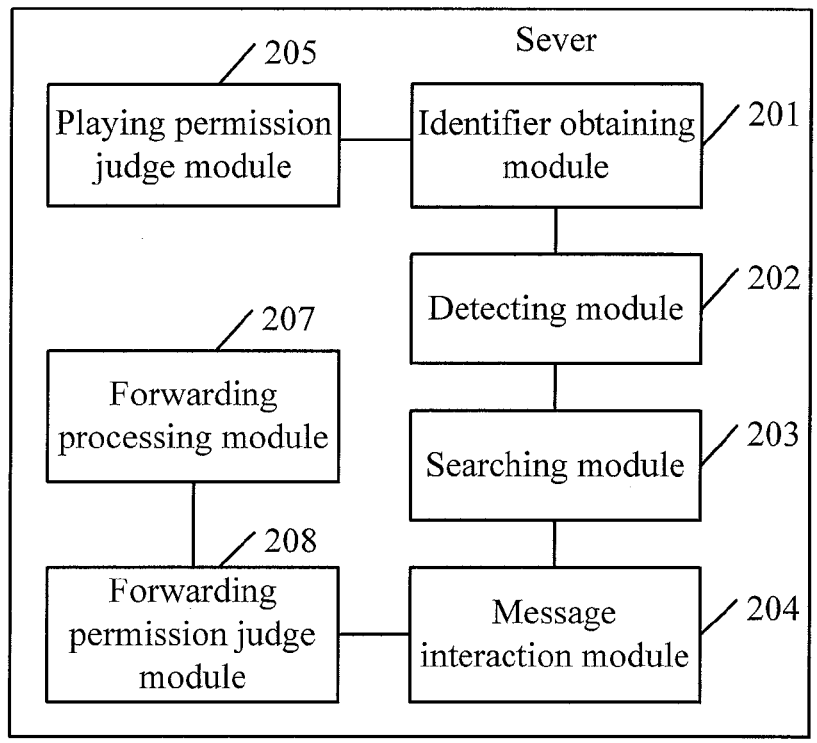
FIG. 10 is a structure diagram of a server provided in yet another embodiment of the present invention.

Referring to FIG. 10, it is a structure diagram of a server provided in yet another embodiment of the present invention. The server may comprise: an identifier obtaining module 201, a detecting module 202, a searching module 203, a message interaction module 204, a playing permission judge module 205, a forwarding permission judge module 206 and a forwarding processing module 207. Wherein, for structures of the identifier obtaining module 201, the detecting module 202, the searching module 203, and the message interaction module 204, one may refer to the related description of the embodiment shown in FIG. 9, which will not be described here to avoid redundancy.

The playing permission judge module 205 is configured to judge whether the second terminal has a playing permission of multi-media message, and to inform the identifier obtaining module 201 to obtain the publishing identifier carried in a multi-media message play request if the second terminal has the playing permission of multi-media message when receiving the multi-media message play request sent by the second terminal in the SNS system.

The procedure that the playing permission judge module 205 performs the playing permission judgment may include: firstly, obtaining an user information (such as: an user identity) of the publisher by which the multi-media message is requested to play, and an user information (such as: an user identity) corresponding to the second terminal; secondly, judging the SNS relationship between the publisher and the user corresponding to the second terminal. The SNS relationship may include: a self-relationship, a friend relationship, a stranger relationship, and so on. If the SNS relationship between the publisher and the user corresponding to the second terminal is a self-relationship, namely, the publisher is the user corresponding to the second terminal, then it could be confirmed that the second terminal has the playing permission of multi-media message, then the identifier obtaining module 201 is informed to obtain the publishing identifier carried in the multi-media message play request. If the SNS relationship between the publisher and the user corresponding to the second terminal is a friend relationship, then it could be confirmed that the second terminal has the playing permission of multi-media message, and the identifier obtaining module 201 is informed to obtain the publishing identifier carried in the multi-media message play request. It should be noted that, if the SNS relationship between the publisher and the user corresponding to the second terminal is neither a self-relationship nor a friend relationship, then it could be confirmed that the second terminal does not have the playing permission of multi-media message, and the playing permission judge module 205 may feed a prompt message back to the second terminal to make the second terminal learn that the multi-media message play request is failed and the reason of the failure. Then the second terminal may output the prompt message to the user of the second terminal, e.g. the second terminal may output a prompt message of "Without playing permission, multi-media message play request failed".

The forwarding permission judge module 206 is configured to judge whether the second terminal has a forwarding permission of multi-media message when detects that the second terminal carries out a forwarding operation on the adapted multi-media message.

The forwarding permission judgment performed by the forwarding permission judge module 206 may include judge procedures in the two aspects below. Judge procedure in the first aspect is that: the forwarding permission judge module 206 judges that whether the SNS relationship between the user of the second terminal and the publisher of the adapted multi-media message is a self-relationship or a friend relationship. For the judge procedure in this aspect, one may refer to the judge procedure of the playing permission judge module, and it will not be described here to avoid redundancy. If the judgment result of the first aspect is that: the SNS relationship between the user of the second terminal and the publisher of the adapted multi-media message being neither a self-relationship nor a friend relationship, then the forwarding permission judge module 206 may feed a prompt message back to the second terminal to make the second terminal learn that the forwarding operation of the multi-media message is failed and the reason of the failure. If the judgment result of the first aspect is that: the SNS relationship between the user of the second terminal and the publisher of the adapted multi-media message being self relationship or friend relationship, then go into the judgment in the second aspect.

Judge procedure in the second aspect is that: the forwarding permission judge module 206 judges whether the second terminal has the publishing permission of multi-media message. Because the server may configure, in the background, the publishing permissions of multi-media message of each terminal in the SNS system, the server may perform a publishing permission judgment on the second terminal according to the publishing permission configuration carried out by the server in the background. If the judgment result of the second aspect is that: the second terminal having the publishing permission of multi-media message, then in conjunction with the judgment result in the first aspect, the second terminal has the forwarding permission of multi-media message. If the judgment result of the second aspect is that: the second terminal not having the publishing permission of multi-media message, then the forwarding permission judge module 206 may feed a prompt message back to the second terminal to make the second terminal learn that the forwarding operation on the multi-media message is failed and the reason of the failure.

The forwarding processing module 207 is configured to perform a forwarding process on the adapted multi-media message according to the forwarding operation by the second terminal, if the second terminal has the forwarding permission of multi-media message.

It should be noted that, the forwarding operation performed by the second terminal for the adapted multi-media message may be understood as a publishing operation performed by the second terminal for the adapted multi-media message. For the procedure of the forwarding processing module 207 performing forwarding process on the adapted multi-media message, one may refer to the processing procedure performed by the server when any one of terminals in the SNS system publishes multi-media message.

It should be noted that, the structures and the functions of the server provided by embodiments shown in FIGS. 9 and 10 may be realized by the methods of embodiments shown in FIGS. 4-5. For the specific implementation, one may refer to the description of the above embodiments of the methods, which will not be described here to avoid redundancy.

In this embodiment of the present invention, terminals in the SNS system can play multi-media messages. The server selects an adapted multi-media message for the second terminal according to the publishing identifier carried in the multi-media message play request when receives the multi-media message play request sent by the second terminal in the SNS system, and feeds back the storage address of the adapted multi-media message to the second terminal to make the second terminal be able to play the adapted multi-media message in a relatively good effect, improving the validity of social interaction in the SNS system. Meanwhile, since message interaction may be performed based on multi-media message in the SNS system, variety of message contents is enriched, efficiency of message interaction is improved, and convenience of social activities is enhanced.

This embodiment of the present invention also disclose a SNS system, which may include at least one first terminal, and/or at least one second terminal, and may also include the server in the embodiments shown in FIGS. 6-8 or the server in the embodiments shown in FIGS. 9 and 10. It should be noted that the SNS system of this embodiment may be applied on the methods above.

In this embodiment of the present invention, terminals in the SNS system may publish multi-media messages, play multi-media messages and transcode multi-media messages. Thus, message interaction may be performed based on multi-media messages in the SNS system, thereby enriching variety of message contents, improving efficiency of message interaction, and enhancing convenience of social activities.

A person having ordinary skills in the art can realize that part or whole of the processes in the methods according to the above embodiments may be implemented by a computer program instructing relevant hardware. The program may be stored in a computer readable storage medium. When executed, the program may execute processes in the above-mentioned embodiments of methods. The storage medium may be a magnetic disk, an optical disk, a Read-Only Memory (ROM), a Random Access Memory (RAM), et al.

The foregoing descriptions are merely exemplary embodiments of the present invention, but not intended to limit the protection scope of the present invention. Any variation or replacement made by persons of ordinary skills in the art without departing from the spirit of the present invention shall fall within the protection scope of the present invention. Therefore, the scope of the present invention shall be subject to be appended claims.

What is claimed is:

1. A method for message interaction, comprising the steps of:
    receiving, at a server, a first multi-media message recorded and published by a first terminal when the server detects that the first terminal in a social network service (SNS) system carries out a message publishing operation;
    performing, at the server, a transcoding process on the first multi-media message to generate at least one second multi-media message, and storing the first multi-media message and the at least one second multi-media messages;
    allocating, at the server, a publishing identifier and sending the publishing identifier to the first terminal to inform the first terminal that the message publishing operation is successful, the publishing identifier being used for identifying a storage address of the first multi-media message and a storage address of each of the second multi-media messages;
    obtaining, at the server, the publishing identifier carried in a multi-media message play request and detecting a system parameter of a second terminal, when the server receives the multi-media message play request sent by the second terminal in the SNS system;
    searching, at the server, according to the publishing identifier, for the storage address of the first multi-media message and the storage address of the at least one second multi-media message which are identified by the publishing identifier; and
    selecting, at the server, according to the system parameter of the second terminal, one storage address of a multi-media message adapted to the second terminal from the storage address of the first multi-media message and the storage address of the at least one second multi-media message which are obtained by searching, and sending to the second terminal with the storage address of the multi-media message adapted to the second terminal, to make the second terminal play the adapted multi-media message.

2. The method of claim 1, after receiving, at the server, the first multi-media message recorded and published by the first terminal and before the server carries out the transcoding process on the first multi-media message, the method further comprising:
    judging, at the server, whether the first terminal has a publishing permission of multi-media message,
    wherein, if the first terminal has the publish permission of multi-media message, the step of performing, at the server, the transcoding process on the first multi-media message is executed; the publishing identifier is a view link of a message published by the first terminal, or the publishing identifier is a piece of voice key and is used for indicating that the message published by the first terminal is a multi-media message.

3. The method of claim 1, wherein the step of performing, at the server, the transcoding process on the first multi-media message to generate at least one second multi-media message, and storing the first multi-media message and the at least one second multi-media messages, comprises:
    parsing, at the server, the first multi-media message to obtain an audio/video message in a first format;
    performing, at the server, the transcoding process on the audio/video message in the first format to generate at least one audio/video message in a second format; and
    storing, at the server, the audio/video message in the first format and the at least one audio/video message in the second format;
    wherein, the first multi-media message comprises the audio/video message in the first format, and the second multi-media message comprises the audio/video message in the second format.

4. The method of claim 1, wherein the step of performing, at the server, the transcoding process on the first multi-media message, generating at least one second multi-media message, and storing the first multi-media message and the at least one second multi-media messages comprises:
    parsing, at the server, the first multi-media message to obtain a picture message and an audio/video message in a first format;
    performing, at the server, the transcoding process on the audio/video message in the first format to generate at least one audio/video message in a second format;
    storing, at the server, the picture message, the audio/video message in the first format, and the at least one audio/ video message in the second format, and relating the picture message respectively to the audio/video message in the first format and each of the audio/video messages in the second format;

wherein, the first multi-media message comprises the picture message and the audio/video message in the first format, and the second multi-media message comprises the picture message and the audio/video message in the second format, the audio/video message in the second format being related to the picture message.

5. The method of claim 1, after receiving, at the server, a multi-media message play request sent by the second terminal in the SNS system and before obtaining the publishing identifier carried in the multi-media message play request, the method further comprising:

judging, at the server, whether the second terminal has a permission to publish multi-media message;

wherein, if the second terminal has the permission to publish multi-media message, the step of obtaining, at the server, the publishing identifier carried in the multi-media message play request is executed.

6. The method of claim 1, after sending, at the server, to the second terminal with the storage address of the multi-media message adapted to the second terminal, the method further comprising:

judging, at the server, whether the second terminal has a forwarding permission of multi-media message, when the server detects that the second terminal carries out a forwarding operation on the adapted multi-media message;

performing, at the server, a forwarding process on the adapted multi-media message according to the forwarding operation by the second terminal, if the second terminal has the forwarding permission of multi-media message.

7. The method of claim 2, wherein the step of performing, at the server, the transcoding process on the first multi-media message to generate at least one second multi-media message, and storing the first multi-media message and the at least one second multi-media messages, comprises:

parsing, at the server, the first multi-media message to obtain an audio/video message in a first format;

performing, at the server, the transcoding process on the audio/video message in the first format to generate at least one audio/video message in a second format; and storing, at the server, the audio/video message in the first format and the at least one audio/video message in the second format;

wherein, the first multi-media message comprises the audio/video message in the first format, and the second multi-media message comprises the audio/video message in the second format.

8. The method of claim 2, wherein the step of performing, at the server, the transcoding process on the first multi-media message, generating at least one second multi-media message, and storing the first multi-media message and the at least one second multi-media messages comprises:

parsing, at the server, the first multi-media message to obtain a picture message and an audio/video message in a first format;

performing, at the server, the transcoding process on the audio/video message in the first format to generate at least one audio/video message in a second format;

storing, at the server, the picture message, the audio/video message in the first format, and the at least one audio/video message in the second format, and relating the picture message respectively to the audio/video message in the first format and each of the audio/video messages in the second format;

wherein, the first multi-media message comprises the picture message and the audio/video message in the first format, and the second multi-media message comprises the picture message and the audio/video message in the second format, the audio/video message in the second format being related to the picture message.

9. The method of claim 5, after sending, at the server, to the second terminal with the storage address of the multi-media message adapted to the second terminal, the method further comprising:

judging, at the server, whether the second terminal has a forwarding permission of multi-media message, when the server detects that the second terminal carries out a forwarding operation on the adapted multi-media message;

performing, at the server, a forwarding process on the adapted multi-media message according to the forwarding operation by the second terminal, if the second terminal has the forwarding permission of multi-media message.

10. A server, comprising:

a processor; and a memory coupled to the processor, the memory having stored thereon software units executed by the processor, the software units comprising:

a receiving module, which is configured to receive a first multi-media message recorded and published by a first terminal when the server detects that the first terminal in a social network service (SNS) system carries out a message publishing operation;

a message processing module, which is configured to perform a transcoding process on the first multi-media message to generate at least one second multi-media message, and stores the first multi-media message and the at least one second multi-media message; and an interacting processing module, which is configured to allocate a publishing identifier and send the publishing identifier to the first terminal to inform the first terminal that the message publishing operation is successful, the publishing identifier being used for identifying a storage address of the first multi-media and a storage address of each of the second multi-media messages;

an identifier obtaining module, which is configured to obtain the publishing identifier carried in a multi-media message play request when receives the multi-media message play request sent by a second terminal in the social network service (SNS) system;

a detecting module, which is configured to detect a system parameter of the second terminal;

a searching module, which is configured to search, according to the publishing identifier, for the storage address of the first multi-media message and the storage address of the at least one second multi-media message which are identified by the publishing identifier; and a message interaction module, which is configured to select, according to the system parameter of the second terminal, one storage address of a multi-media message adapted to the second terminal from the storage address of the first multi-media message and the storage address of the at least one second multi-media message which are obtained by searching, and send to the second terminal with the storage address of the multimedia message adapted to the second terminal, to make the second terminal play the adapted multi-media message.

11. The server of claim 10, wherein the software units executed by the processor further comprises:
a permission judge module, which is configured to judge whether the first terminal has a publishing permission of multi-media message, and to inform the message processing module to handle the first multi-media message, if the first terminal has the publishing permission of multi-media message;
wherein, the publishing identifier is a view link of a message published by the first terminal, or the publishing identifier is a piece of voice key and is used for indicating that the message published by the first terminal is a multi-media message.

12. The server of claim 10, wherein the message processing module of the software units executed by the processor, further comprises:
a first parsing unit, which is configured to parse the first multi-media message to obtain an audio/video message in a first format;
a first transcoding processing unit, which is configured to perform a transcoding process on the audio/video message in the first format to generate at least one audio/video message in a second format;
a first storage unit, which is configured to store the audio/video message in the first format and the at least one audio/video message in the second form;
wherein, the first, multi-media message comprises the audio/video message in the first format, and the second multi-media message comprises the audio/video message in the second format.

13. The server of claim 10, wherein the message processing module of the software units executed by the processor, further comprises:
a second parsing unit, which is configured to parse the first multi-media message to obtain a picture message and a audio/video message in a first format;
a second transcoding processing unit, which is configured to perform a transcoding process on the audio/video message in the first format to generate at least one audio/video message in a second format;
a second storage unit, which is configured to store the picture message, the audio/video message in the first format and the at least one audio/video message in the second format, and relate the picture message respectively to the audio/video message in the first format and each of the audio/video messages in the second format;
wherein, the first multi-media message comprises the picture message and the audio/video message in the first format, and the second multi-media message comprises the picture message and the audio/video message in the second format, the audio/video message in the second format being related to the picture message.

14. The server of claim 10, further comprising:
a playing permission judge module, which is configured to judge whether the second terminal has a playing permission of multi-media message, and inform the identifier obtaining module to obtain the publishing identifier carried in a multi-media message play request if the second terminal has the playing permission of multi-media message, when receives the multi-media message play request sent by the second terminal in the SNS system.

15. The server of claim 10, further comprising:
a forwarding permission judge module, which is configured to judge whether the second terminal has a forwarding permission of multi-media message when detects that the second terminal carries out a forwarding operation on the adapted multi-media message;
a forwarding processing module, which is configured to perform a forwarding process on the adapted multi-media message according to the forwarding operation by the second terminal, if the second terminal has the forwarding permission of multi-media message.

16. The server of claim 11, wherein the message processing module of the software units executed by the processor, further comprises:
a first parsing unit, which is configured to parse the first multi-media message to obtain an audio/video message in a first format;
a first transcoding processing unit, which is configured to perform a transcoding process on the audio/video message in the first format to generate at least one audio/video message in a second format;
a first storage unit, which is configured to store the audio/video message in the first format and the at least one audio/video message in the second form;
wherein, the first multi-media message comprises the audio/video message in the first format, and the second multi-media message comprises the audio/video message in the second format.

17. The server of claim 11, wherein the message processing module of the software units executed by the processor, further comprises:
a second parsing unit, which is configured to parse the first multi-media message to obtain a picture message and a audio/video message in a first format;
a second transcoding processing unit, which is configured to perform a transcoding process on the audio/video message in the first format to generate at least one audio/video message in a second format;
a second storage unit, which is configured to store the picture message, the audio/video message in the first format and the at least one audio/video message in the second format, and relate the picture message respectively to the audio/video message in the first format and each of the audio/video messages in the second format;
wherein, the first multi-media message comprises the picture message and the audio/video message in the first format, and the second multi-media message comprises the picture message and the audio/video message in the second format, the audio/video message in the second format being related to the picture message.

* * * * *